United States Patent [19]

Urai

[11] 4,368,917
[45] Jan. 18, 1983

[54] VEHICLE SEAT MEMBER INTEGRALLY FORMED OF SYNTHETIC RESIN MATERIAL

[75] Inventor: Muneharu Urai, Tokyo, Japan

[73] Assignee: Tachikawa Spring Co., Ltd., Tokyo, Japan

[21] Appl. No.: 105,754

[22] Filed: Dec. 20, 1979

[30] Foreign Application Priority Data

Dec. 27, 1978 [JP] Japan ............................... 53-160051

[51] Int. Cl.³ .............................................. A47C 7/02
[52] U.S. Cl. ............................. 297/452; 297/DIG. 2; 297/458; 297/459
[58] Field of Search ................. 297/DIG. 2, 458, 459, 297/460, 457, 452, 453; 16/DIG. 13; 5/DIG. 1, DIG. 2

[56] References Cited

U.S. PATENT DOCUMENTS

| D. 219,813 | 2/1971 | McQueen | 297/DIG. 2 |
| 820,227 | 5/1906 | Martin | 297/458 |
| 2,395,468 | 2/1946 | Eames | 5/DIG. 1 |
| 2,541,835 | 2/1951 | Saarinen | 5/DIG. 1 |
| 2,808,875 | 10/1957 | Bargen | 297/DIG. 2 |
| 2,824,602 | 2/1958 | Collins et al. | 297/DIG. 2 |
| 2,957,184 | 10/1960 | Smith | 297/DIG. 2 |
| 3,006,688 | 10/1961 | Ouellette | 297/DIG. 2 |
| 3,259,435 | 7/1966 | Jordan, Jr. | 297/DIG. 2 |
| 3,411,824 | 11/1968 | White | 297/458 X |
| 3,639,002 | 2/1972 | Tischler | 297/452 |
| 4,068,889 | 1/1978 | Pierce et al. | 16/DIG. 13 |

FOREIGN PATENT DOCUMENTS

| 2118216 | 11/1979 | Fed. Rep. of Germany | 297/457 |
| 1261962 | 4/1961 | France | 297/457 |
| 1024119 | 3/1966 | United Kingdom | 297/457 |

*Primary Examiner*—James T. McCall
*Attorney, Agent, or Firm*—Oldham, Oldham, Hudak & Weber Co.

[57] ABSTRACT

A seat member providing a support structure of a seat in a vehicle is integrally formed of a synthetic resin material and includes a seat base portion and wing or flap portions. The seat base portion is formed with a plurality of openings and is partly thinner than the remainder to provide desired resiliency. The flap portions are formed with a plurality of openings or corrugations and are also partly thinner than the remainder to provide additional resiliency. Portions functioning as suspension springs may be integrally formed with the seat base portion together with a frame including upper rails of a slide rail unit. Reinforcing wires may be embedded in both the seat base portion and the flap portions.

10 Claims, 22 Drawing Figures

VEHICLE SEAT MEMBER INTEGRALLY FORMED OF SYNTHETIC RESIN MATERIAL

BACKGROUND OF THE INVENTION

This invention relates to a seat member integrally formed of a synthetic resin material to provide a support structure of a seat in a vehicle.

Conventional bucket seats in vehicles, especially, automobiles have comprised a support structure in the form of a spring assembly made by assembling or conncting coil springs, S springs, formed springs, parallelly arranged spring wires or the like to provide the seat base portion or seat back portion and wing or flap portions, a pad of a synthetic resin foam material supported on the support structure, and a surface material covering the pad. A conventional bucket seat construction employing parallelly arranged spring wires as its support structure is disclosed in, for example, U.S. Pat. No. 3,639,002. The bucket seal construction disclosed in this U.S. patent has been advantageous from the viewpoints of mass production and cost since the springs such as the coil springs and S springs employed at that time as the principal elements of bucket seat construction are replaced by inexpensive spring wires arranged in parallel. However, the proposed seat construction has had still such drawbacks that it requires a considerably large number of parts, hence, many steps for the manufacture.

The present invention is based on a departure from the concept of using metal springs or wires as principal means for providing desired resiliency in such a prior art product. In the present invention, the metal springs or wires are replaced by an integrally-formed support structure of a synthetic resin material, and a plurality of suitable cutouts or openings are formed in the support structure so that the desired resiliency can be provided by the combination of the inherent resiliency of the synthetic resin material itself and the structural resiliency of the support structure owing to the formation of these cutouts or openings. In other words, the seat member according to the present invention comprises a single support structure integrally formed of a synthetic resin material and eliminates the use of the prior art elements such as the coil springs, S springs, formed springs, end wires and frames. Therefore, the seat member according to the present invention is very simple in construction, light in weight and can be manufactured at low cost without requiring many steps.

It is therefore a primary object of the present invention to provide a novel seat member for use in a vehicle, which has the advantages of simple construction, light weight and low cost.

In accordance with the present invention, there is provided a seat member for use in a vehicle comprising a single support structure integrally formed of a synthetic resin material, said support structure including a seat base portion or a seat back portion formed with a plurality of cutouts or openings to provide desired resiliency, and wing or flap portions extending gradually upward at an angle from at least the outer side edges of the seat base portion or the seat back portion.

The synthetic resin material employed to provide the seat member according to the present invention is preferably, but not limited, that which is easily moldable, has a low specific gravity and is excellent in the physical properties including strength and resiliency. Such a material includes, for example, FRP (fiberglass reinforced plastics) and FRTP (fiberglass reinforced thermoplastics) such as AZDEL (trademark). A reinforced plastic material of the above kind but including carbon fibers in lieu of the glass fibers is also suitable for the purpose.

BRIEF DESCRIPTION OF DRAWINGS

The present invention will now be described in detail with reference to the accompanying drawings, in which:

FIG. 1b is a schematic longitudinal sectional view of one of the wing or flap portions of the seat member taken along the line 1b—1b in FIG. 1a;

FIG. 1c is a schematic longitudinal sectional view of the seat base portion taken along the line 1c—1c in FIG. 1a;

FIG. 1d is a schematic cross-sectional view taken along the line 1d—1d in FIG. 1a;

FIGS. 3a to 3c show a second embodiment of the present invention, in which FIG. 3a is a schematic plan view, FIG. 3b a schematic side elevational view and FIG. 3c a schematic cross-sectional view taken along the line 3c—3c in FIG. 3a;

FIGS. 4a to 4c show a third embodiment of the present invention, in which FIG. 4a is a schematic plan view, FIG. 4b a schematic side elevational view and FIG. 4c a schematic cross-sectional view taken along the line 4c—4c in FIG. 4a;

FIGS. 5a to 5c show a fourth embodiment of the present invention, in which FIG. 5a is a schematic plan view, FIG. 5b a schematic side elevational view and FIG. 5c a schematic cross-sectional view taken along the line 5c—5c in FIG. 5a;

FIGS. 8a to 8c show a fifth embodiment of the present invention, in which FIG. 8a is a schematic plan view, FIG. 8b a schematic longitudinal sectional view taken along the line 8b—8b in FIG. 8a, and FIG. 8c a schematic cross-sectional view taken along the line 8c—8c in FIG. 8a; and FIGS. 9a to 9c show a sixth embodiment of the present invention, in which FIG. 9a is a schematic plan view, FIG. 9b a longitudinal sectional view taken along the line 9b—9b in FIG. 9a, and FIG. 9c a schematic cross-sectional view taken along the line 9c—9c in FIG. 9a.

DESCRIPTION OF THE INVENTION

While the accompanying drawings illustrate an application of the present invention to a base portion of a bucket seat by way of example, it is apparent that the present invention is equally effectively applicable to a seat back portion of such a seat construction.

Figure 1A:
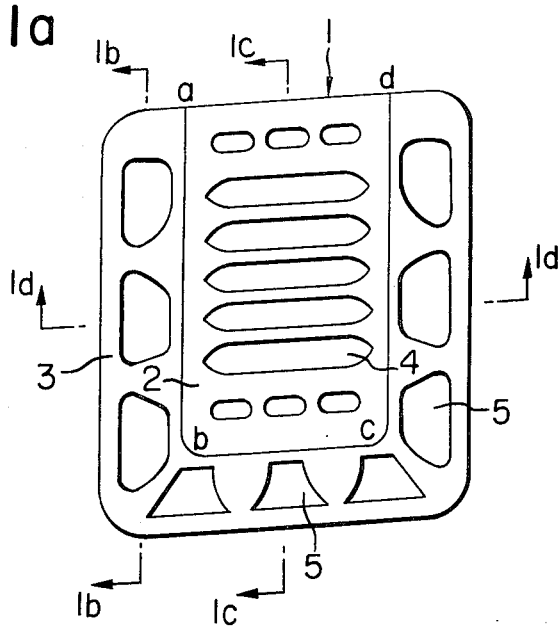
FIG. 1a is a schematic plan view showing in more or less perspective fashion a first embodiment of the seat member according to the present invention.
Figure 1B:
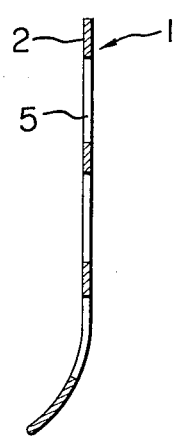
Figure 1C:
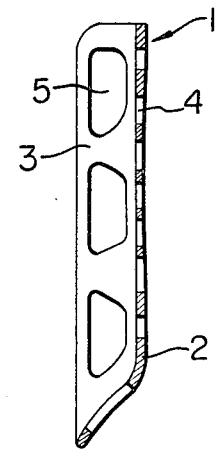
Figure 1D:
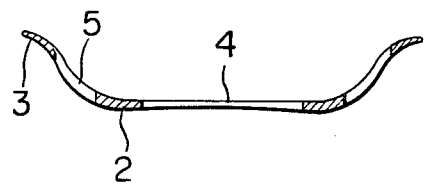

Referring now to FIGS. 1a to 1d showing a first embodiment of the present invention, the seat member is generally designated by the reference numeral 1. The zone inside the lines abcd defines a base portion 2 of the seat member 1, and wing or flap portions 3 extend outward in three directions from the base portion 2. As seen in FIGS. 1b, 1c and 1d, these flap portions 3 extend upward at an angle in a gradual manner.

A plurality of cutouts or openings 4 of various shapes are formed in the seat base portion 2 as best shown in FIG. 1a. The size and arrangement of these openings 4 and also the interval between these openings 4 in the seat base portion 2 are determined on the basis of the teaching of the human engineering so that the area loaded with a weight heavier than the remainder makes greater deformation, that is, such an area is more resilient than the remainder, and an occupant sitting on the seat base portion 2 feels soft and comfortable. Further, as shown in FIGS. 1c and 1d, this area is thinner than the remainder so that this reduced thickness can also provide a variation in the resiliency distribution. The thickness of the remaining areas required from the viewpoint of mechanical strength is increased to ensure the desired mechanical strength of the seat base portion 2.

A plurality of cutouts or openings 5 of various shapes are also formed in the flap portions 3 for the purpose similar to that above described. These openings 5 are substantially analogous in shape to a triangle or a trapezoid and have their largest sides lying close to the outer peripheral edges of the flap portions 3 so that the flap portions 3 can also exhibit a great resiliency. Further, for the same purpose as that described with reference to the seat base portion 2, the thickness of the flap portions 3 is gradually reduced toward the outer peripheral edges.

This seat member 1 is integrally formed of a synthetic resin material which is preferably a fiberglass of fiber-carbon reinforced thermoplastic material such as AZDEL described hereinbefore.

Figure 2:
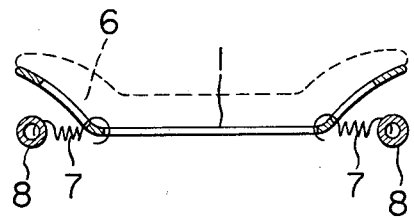
FIG. 2 is a schematic cross-sectional view of a semi-finished product obtained by mounting the first embodiment of the seat member shown in FIGS. 1a-1d on a frame.

FIG. 2 shows a semi-finished product in which the seat member 1 shown in FIGS. 1a to 1d is mounted on or secured to a frame 8 by means of tension or suspension springs 7, and a pad 6 of a polyurethane foam material is placed on or bonded to the seat member 1. In such a seat construction, the weight of an occupant is initially born by the pad 6 and is also supported by the combustion of the resiliency of the seat member 1 and the resiliency of the suspension springs 7. Therefore, the weight and vibrations can be effectively absorbed or cushioned in spite of the fact that the seat member 1 is relatively thin. The pad 6 of polyurethane foam may be provided by integrally foaming the raw material with the seat member 1.

Figure 3A:
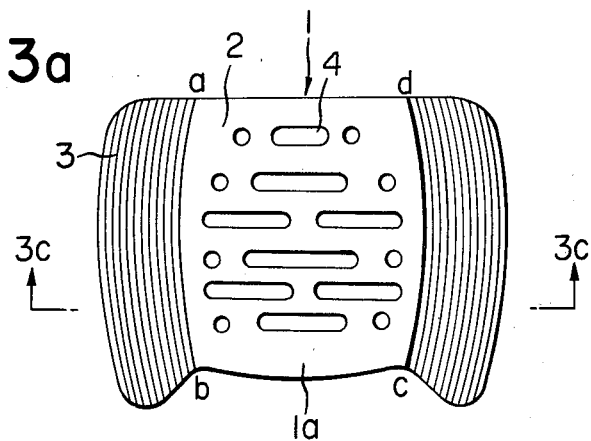
Figure 3B:
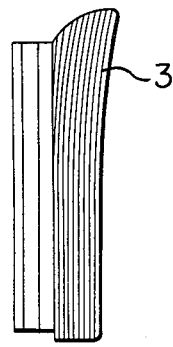
Figure 3C:
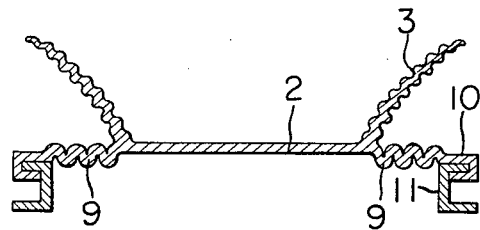

A second embodiment of the present invention shown in FIGS. 3a to 3c differs from the first embodiment in that the boundary lines a-b and c-d between the seat base portion 1 and the wing or flap portions 3 are not rectilinear but are in the form of an arc so as to conform to the shape of the seat engaging parts of an occupant. In this second embodiment, the flap portions 3 are corrugated so as to increase the resiliency thereof. The interval between the corrugations may be suitably selected in order that the desired resiliency can be provided in combination with the thickness distribution in the flap portions 3. When so desired, corrugations of large width may be combined with those of small width.

A required number of suspension spring-functioning portions 9 of the same synthetic resin material as that of the seat member 1 are integrally formed as extensions of the end edges of the seat base portion 2, that is, as extensions of the boundaries between the seat base portion 2 and the flap portions 3, and these portions 9 terminate at their other end in a frame 10. This frame 10 is also integrally formed of the same synthetic resin material. The frame 10 is secured to a separately formed frame 11. It will thus be seen that the elements including the springs 7 and the frame 8 in the seat construction shown in FIG. 2 are integrally formed with the seat member 1 to simplify the seat construction.

A plurality of suitable cutouts or openings may also be formed in the flap portions 3 in addition to the corrugations so as to provide a greater degree of resiliency.

Figure 4A:
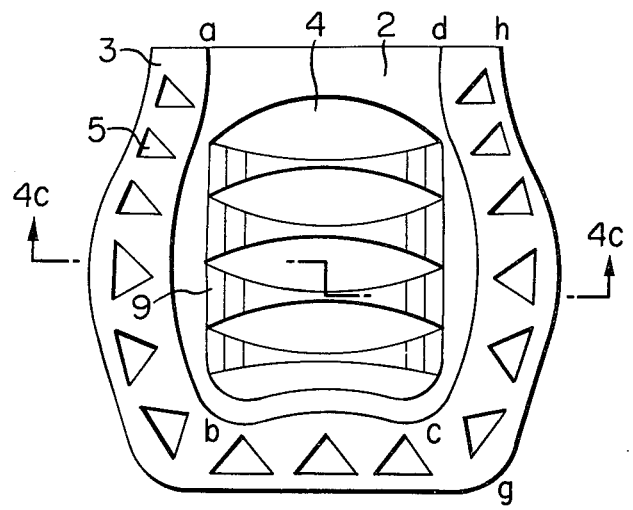
Figure 4B:
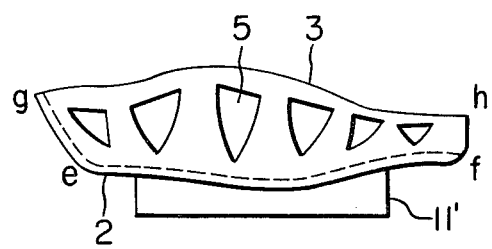
Figure 4C:
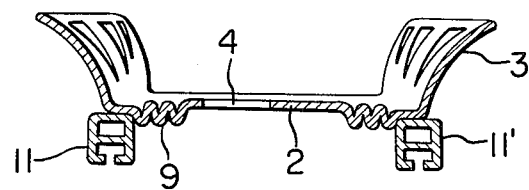

FIGS. 4a to 4c show a third embodiment of the present invention. In this embodiment, the suspension spring-functioning portions 9 are formed beneath the flap portions 3 at positions interior relative to the boundaries between the seat base portion 2 and the flap portions 3. Therefore, a frame 11' engages with the outer edges of the suspension spring-functioning portions 9, or it engages with the connections between the seat base portion 2 and the flap portions 3. As seen in FIG. 4a, the lines abcd are curved to conform to the shape of the seat engaging parts of an occupant as in the embodiment shown in FIGS. 3a to 3c. Also, as seen in FIG. 4b, the upper surface of the seat base portion 2 is also curved as a whole as illustrated by the curve e-f so that this curved surface conforms also to the shape of the seat engaging parts of the occupant.

The separate frame 11' includes the upper rails of the slide rail unit integrally formed therewith.

Figure 5A:
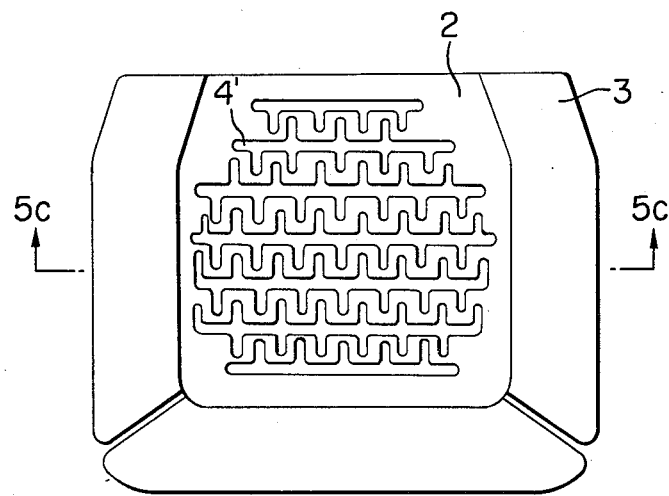
Figure 5B:
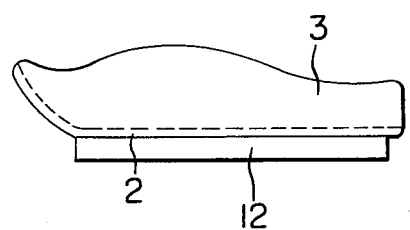
Figure 5C:
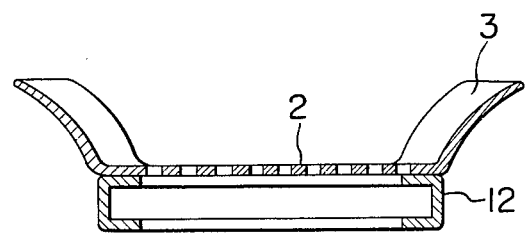

In a fourth embodiment of the present invention shown in FIGS. 5a to 5c, a plurality of cutouts or openings 4' of brachiate and/or alternate pattern are formed in parallel relation in the seat base portion 2. This construction provides a greater degree of resiliency than that of the seat construction provided with the openings 4 of simple pattern. As seen in FIG. 5a, the wing or flap portions 3 are not connected to each other but are spaced apart by a small gap from each other so as to increase the inherent resiliency of each of them. A frame 12 is analogous to a box having aligned central openings.

Figure 6:
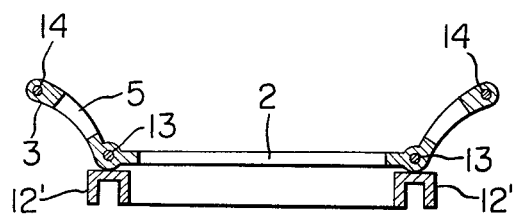
FIG. 6 is a schematic cross-sectional view of a modification in which reinforcing wires are embedded in the boundary areas between the seat base portion and the flap portions and also in the upper end edges of the flap portions.

FIG. 6 shows a modification of the embodiment shown in FIGS. 5a to 5c. In this modification, reinforcing end wires 13 of steel are embedded in the peripheral edges of the seat base portion 2, and reinforcing end wires 14 of steel or also embedded in the upper end edges of the flap portions 3. A frame 12' is also separately formed like the frame 12 although the shape of the former differs from that of the latter.

Figure 7:
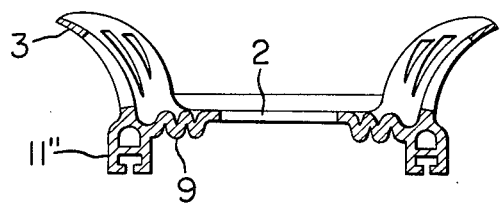
FIG. 7 is a schematic cross-sectional view of another modification in which suspension spring-functions portions are integrally formed beneath the boundary areas between the seat base portion and the flap portions, and a frame including upper rails of a slide rail unit is also integrally formed.

FIG. 7 shows a modification of the embodiment shown in FIGS. 4a to 4c. In this modification, the suspension spring-functioning portions 9 and a frame 11" are integrally formed with the seat member 1. This frame 11" is similar to the frame 11' in that the upper rails of the slide rail unit are integrally formed therewith.

Figure 8A:
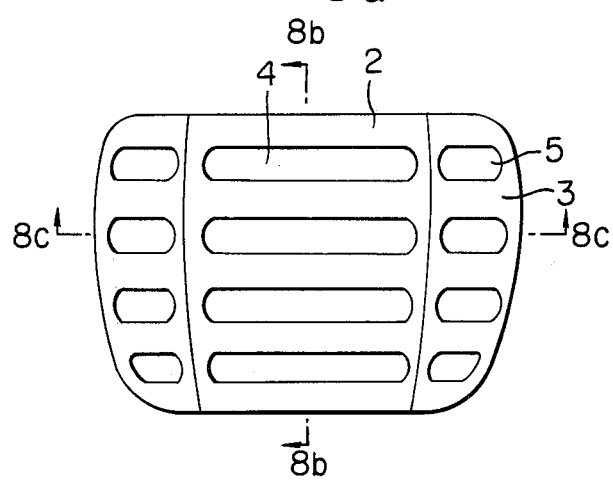
Figure 8B:
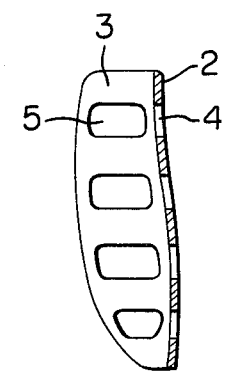
Figure 8C:
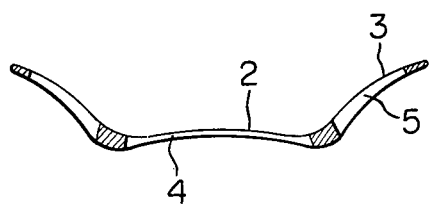

In a fifth embodiment shown in FIGS. 8a to 8c, the openings 5 formed in the wing or flap portions 3 align with each other and align also with the openings 4 formed in the seat base portion 2. The central area of the seat base portion 2 has a thickness less than that of the remainder, and the thickness of the flap portions 3 is reduced gradually toward the upper end edges. Further, as seen in FIG. 8b, the upper surface of the seat base portion 2 is slightly curved.

Figure 9A:
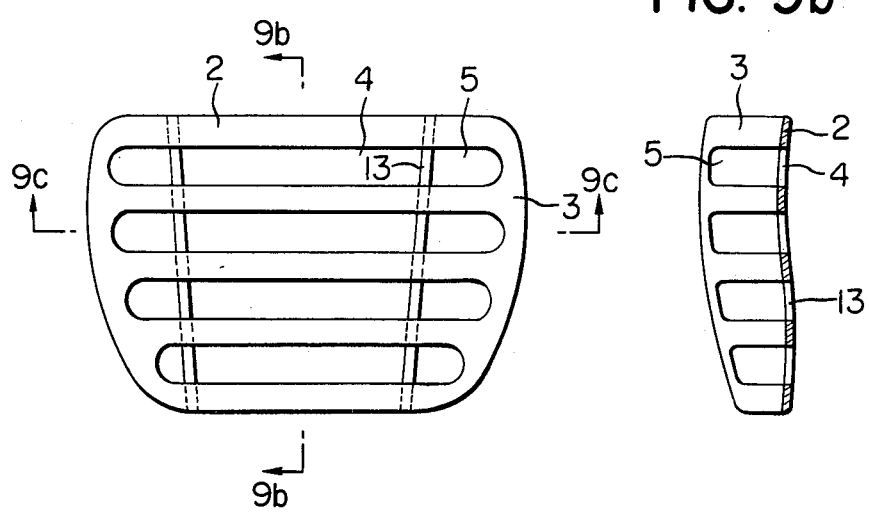
Figure 9B:
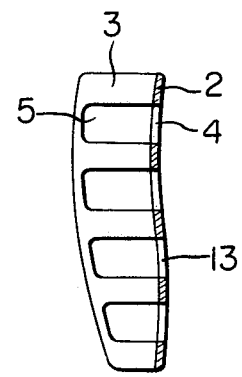
Figure 9C:
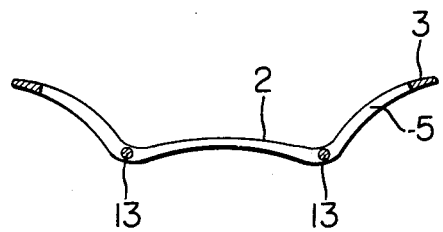

In a sixth embodiment of the present invention shown in FIGS. 9a to 9c, the aligned openings 4 and 5 in the fifth embodiment are foined together to provide elongated continuous openings, and reinforcing wires 13 of steel are embedded in the boundary areas between the seat base portion 2 and the flap portion 3.

It will be understood from the foregoing detailed description of various preferred embodiments of the present invention that a seat member which replaced the prior art spring assembly and which is light in weight can be manufactured at low cost within a shortened length of time and with a minimum of steps without requiring a welder, a spring-making apparatus and any other apparatus used hitherto.

What we claim is:

1. A seat member for use in a vehicle comprising a single support structure integrally formed of a synthetic resin material, said support structure including a center support portion formed with a plurality of openings to provide resiliency, and edge portions extending gradually upward at an angle from at least the outer side edges of said center support portion, the size of the openings and the thickness of the support and edge portions varying inversely with the normal load applied thereto, a plurality of openings being formed in said edge portions to provide additional resiliency.

2. A seat member as claimed in claim 1, wherein a plurality of corrugations are formed on said edge portions to provide an additional resiliency.

3. A seat member as in claim 1, wherein said center support and edge portions comprise a seat base portion and side edge portion respectively.

4. A seat member as claimed in claim 3, wherein suspension spring-functioning portions extending from the outer side edges of said seat base portion are integrally formed with said seat base portion by a synthetic resin material which may be the same as that of said seat base portion.

5. A seat member as claimed in claim 3, wherein suspension spring-function portions underlying said seat base portion of positions close to the boundaries between said seat base portion and said side edge portions are integrally formed with said seat base portion by a synthetic resin material which may be the same as that of said seat base portion.

6. A seat member as claimed in claim 3, wherein reinforcing wires of steel are embedded in the boundary areas between said seat base portion and said side edge portions.

7. A seat member as claimed in claim 3, wherein reinforcing wires of steel are embedded in the upper end edges of said side edge portions.

8. A seat member as claimed in claim 3, wherein a frame including upper rails of a slide rail unit is integrally formed with said seat base portion by a synthetic resin material which may be the same as that of said seat base portion.

9. A seat member as claimed in claim 1, wherein the thickness of the central area only of said seat base portion is less than that of the remainder to increase the degree of resiliency in that area.

10. A seat member for use in a vehicle comprising a single support structure integrally formed of a synthetic resin material, said support structure including a center support portion formed with a plurality of openings to provide resiliency, and edge portions, having openings therein, extending gradually upward at an angle from at least the outer side edges of said center support portion the size of the openings in the center support portion and edge portions varying inversely with the normal load applied thereto.

* * * * *